United States Patent
Watanabe et al.

(10) Patent No.: US 7,516,278 B2
(45) Date of Patent: Apr. 7, 2009

(54) SYSTEM CONTROLLER, SPECULATIVE FETCHING METHOD, AND INFORMATION PROCESSING APPARATUS

(75) Inventors: Akira Watanabe, Kawasaki (JP); Go Sugizaki, Kawasaki (JP); Shigekatsu Sagi, Kawasaki (JP); Masahiro Mishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 160 days.

(21) Appl. No.: 10/999,973

(22) Filed: Dec. 1, 2004

(65) Prior Publication Data

US 2006/0036807 A1 Feb. 16, 2006

(30) Foreign Application Priority Data

Aug. 16, 2004 (JP) .............................. 2004-236513

(51) Int. Cl.
G06F 12/00 (2006.01)

(52) U.S. Cl. ........................ 711/137; 711/154; 711/204; 712/207

(58) Field of Classification Search .................... 710/38, 710/39; 711/118, 137, 168, 213; 712/207; 718/105
See application file for complete search history.

(56) References Cited

U.S. PATENT DOCUMENTS

| | | | | |
|---|---|---|---|---|
| 5,761,708 | A * | 6/1998 | Cherabuddi et al. | 711/118 |
| 5,809,550 | A * | 9/1998 | Shukla et al. | 711/167 |
| 6,012,134 | A | 1/2000 | McInerney et al. | |
| 6,098,115 | A | 8/2000 | Eberhard et al. | 710/7 |
| 6,119,203 | A * | 9/2000 | Snyder et al. | 711/137 |
| 6,134,633 | A * | 10/2000 | Jacobs | 711/137 |
| 6,173,410 | B1 * | 1/2001 | Bondi et al. | 713/324 |
| 6,397,356 | B1 * | 5/2002 | Yonezawa | 714/43 |
| 6,473,405 | B2 * | 10/2002 | Ricciulli | 370/238 |
| 6,493,802 | B1 * | 12/2002 | Razdan et al. | 711/144 |
| 6,502,167 | B1 * | 12/2002 | Tanaka et al. | 711/114 |
| 6,810,466 | B2 * | 10/2004 | Henry et al. | 711/137 |
| 2001/0003839 | A1 | 6/2001 | Kondo | 711/144 |

(Continued)

FOREIGN PATENT DOCUMENTS

EP 0 426 354 A2 5/1991

(Continued)

OTHER PUBLICATIONS

Glenn Reinman Brad Calder and Todd Austin. Fetch Directed Instruction Prefetching (PPT). Jan. 31, 2000 Index of Micro32 Presentations.*

(Continued)

*Primary Examiner*—Kevin L Ellis
*Assistant Examiner*—Kalpit Parikh
(74) *Attorney, Agent, or Firm*—Staas & Halsey LLP

(57) ABSTRACT

A system controller, which executes a speculative fetch from a memory before determining whether data requested for a memory fetch request is in a cache by searching tag information of the cache, includes a consumption determining unit that monitors a consumption status of a hardware resource used in the speculative fetch, and determines whether a consumption of the hardware resource exceeds a predetermined value; and a speculative-fetch issuing unit that stops issuing the speculative fetch when the consumption determining unit determines that the consumption of the hardware resource exceeds the predetermined value.

15 Claims, 10 Drawing Sheets

U.S. PATENT DOCUMENTS

2003/0079089 A1* 4/2003 Barrick et al. ............... 711/137
2003/0126321 A1* 7/2003 Sinha ........................ 710/38

FOREIGN PATENT DOCUMENTS

| EP | 0817 007 A2 | 1/1998 |
|---|---|---|
| JP | 2000-29786 | 1/2000 |
| JP | 2001-167077 | 6/2001 |

OTHER PUBLICATIONS

Communication from the European Patent office in the related European patent application No. 04257538.1 dated Jun. 27, 2008.

* cited by examiner

SYSTEM CONTROLLER, SPECULATIVE FETCHING METHOD, AND INFORMATION PROCESSING APPARATUS

BACKGROUND OF THE INVENTION

1) Field of the Invention

The present invention relates to a system controller, a speculative fetching method, and an information processing apparatus for executing speculative fetching in a memory before determining whether data requested by a memory fetch request is in a cache by searching tag information of the cache.

2) Description of the Related Art

Improvements in operating frequencies of a large scale integration (LSI) have been noticeable in recent years, and the time taken to access the memory has become relatively slow in comparison with the processing time in the LSI. According to one solution, a system controller (SC) receives a memory fetch request from a central processing unit (CPU) or an input/output (I/O) controller (IOP), and, before determining whether the requested data is stored in a cache, performs speculative fetching in which a request for memory fetching is sent to a memory controller (MAC) (see, for example, Japanese Patent Application Laid-open Publication No. 2000-29786 and Japanese Patent Application Laid-open Publication No. 2001-167077).

The SC holds information relating to all CPUs (hereinafter, "tag information") such as the data addresses of data stored in the cache of the CPU, update status, and the like. In response to the memory fetch request, the SC determines whether the requested data is in the cache by searching the tag information. Instead of accessing the memory when the requested data is not in the cache, the SC speculatively accesses the memory in the stage before determining whether the requested data is in the cache, at the same time as searching the tag information.

This speculative fetching allows memory access to start early, and, when the data is not in the cache, shortens the memory access waiting time (hereinafter, "latency").

In speculative fetching, when the data requested by the memory fetch request is in the cache of the CPU, the SC requests the CPU that holds the requested data to move it out, transfers the move-out data to the apparatus that is the source of the request, and discards the response data that is speculatively fetched.

Discarding of the response data that is speculatively fetched leads to a possibility that hardware resources, such as a buffer and a bus, which are consumed in speculative fetching, may have delayed processes other than the memory fetch request. The reason is that it may have been possible to execute other processes if the speculative fetching had not been executed. Therefore, speculative fetching has a drawback that it sometimes results in poor latency, since other processing is to be delayed.

When using the bus to send the speculative fetching response data first, move-out data from other CPUs must wait before using the same bus, leading to a problem that speculative fetching actually makes the memory access latency worse.

In view of the features of most programs, memory fetch requests tend to be generated in addresses that are relatively close to each other, in concentration over a short time period. Since speculative fetching is activated by memory fetch requests, speculative fetches are also liable to be generated in concentration. Therefore, the load tends to concentrate on one SC among a plurality of SCs whose addresses are interleaved, while the loads of the other SCs are light, a situation that leads to a problem of even more frequent speculative fetches by the speculative fetching mechanism.

It is determined whether to use the speculative fetch response data based on the search result of all the CPUs. Therefore, until the cache search result is clear, the speculative fetch response data must be stored somewhere in the system and make a queue with the cache search result later.

Accordingly, when the speculative fetch response data arrives before the cache search result, if the improvement in the memory latency achieved by speculative fetching is to be utilized fully, the best queue is the SC that is nearest to the apparatus that issued the memory fetch request (hereinafter, "terminal SC").

In transferring the response data to the request source apparatus, the terminal SC does not require hardware resources on the transfer path of the response data, and can therefore immediately transfer the speculative fetch response data, obtained from the cache search result, to the request source apparatus, when use of the response data is confirmed.

However, when the terminal SC is the queue, even after it has been decided to discard the speculative fetch response data based on the cache search result, the speculative fetch response data must be transferred to the terminal SC. This results in a problem that, when there is a high load on the transfer path to the terminal SC, hardware resources are further wasted by speculative fetch response data that is to be discarded, further increasing the load.

SUMMARY OF THE INVENTION

It is an object of the present invention to solve at least the above problems in the conventional technology.

A system controller according to one aspect of the present invention, which executes a speculative fetch from a memory before determining whether data requested for a memory fetch request is in a cache by searching tag information of the cache, includes a consumption determining unit that monitors a consumption status of a hardware resource used in the speculative fetch, and determines whether a consumption of the hardware resource exceeds a predetermined value; and a speculative-fetch issuing unit that stops issuing the speculative fetch when the consumption determining unit determines that the consumption of the hardware resource exceeds the predetermined value.

An information processing apparatus according to another aspect of the present invention, which, when executing a memory fetch, executes a speculative fetch from a memory before determining whether data requested for a memory fetch request is in a cache by searching tag information of the cache, includes a consumption determining unit that monitors a consumption status of a hardware resource used in the speculative fetch, and determines whether a consumption of the hardware resource exceeds a predetermined value; and a speculative-fetch issuing unit that stops issuing the speculative fetch when the consumption determining unit determines that the consumption of the hardware resource exceeds the predetermined value.

A speculative fetching method according to still another aspect of the present invention, which is used for a system controller that executes a speculative fetch from a memory before determining whether data requested for a memory fetch request is in a cache by searching tag information of the cache, includes monitoring a consumption status of a hardware resource used in the speculative fetch; determining whether a consumption of the hardware resource exceeds a predetermined value; and stopping issuing the speculative fetch when it is determined that the consumption of the hardware resource exceeds the predetermined value.

The other objects, features, and advantages of the present invention are specifically set forth in or will become apparent from the following detailed description of the invention when read in conjunction with the accompanying drawings.

DETAILED DESCRIPTION

Exemplary embodiments of a system controller, a speculative fetching method, and an information processing apparatus according to the present invention will be explained below in detail with reference to the accompanying drawings.

Figure 1:
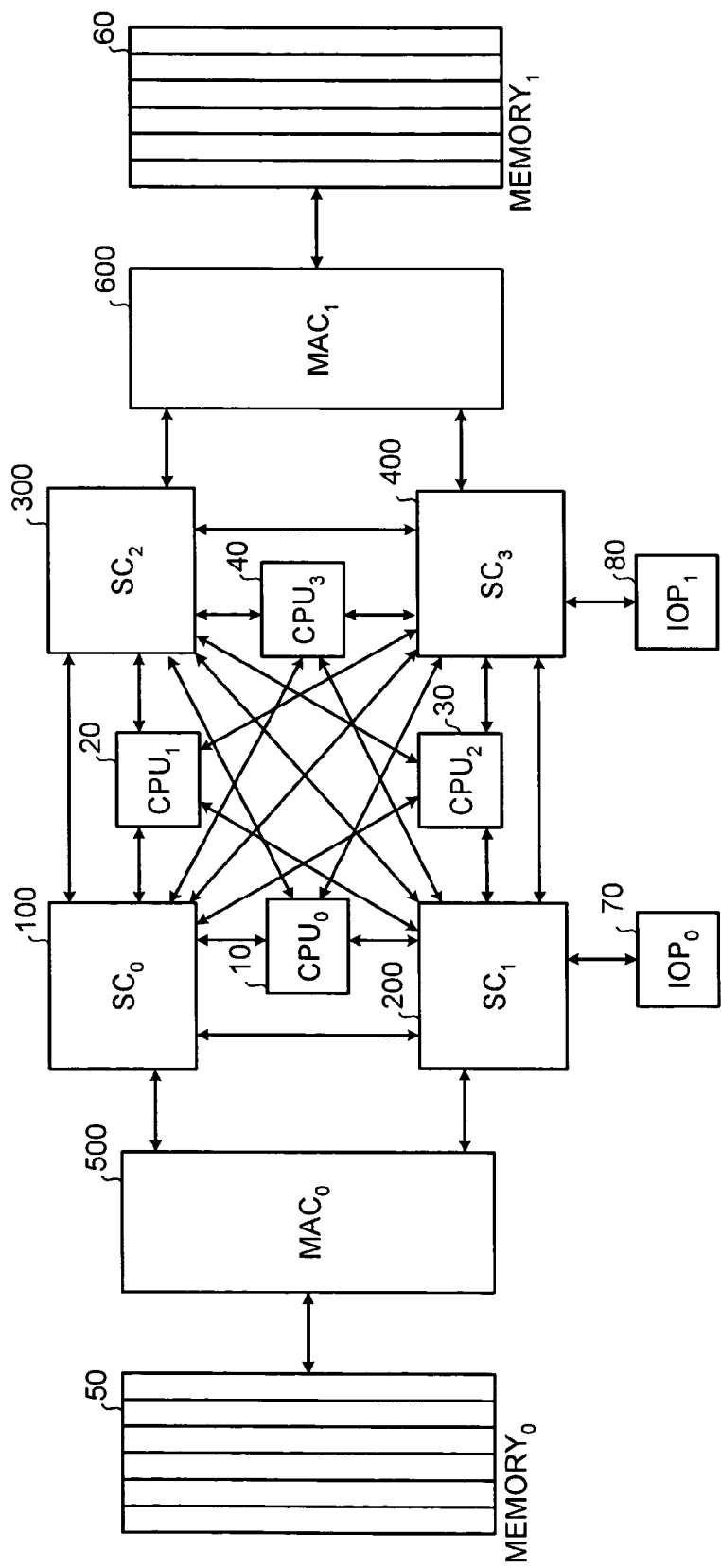
FIG. 1 is a functional block diagram of the constitution of an information processing apparatus according to a first embodiment.

FIG. 1 is a functional block diagram of the constitution of the information processing apparatus according to a first embodiment of the present invention. The information processing apparatus includes four CPUs represented by $CPU_0$ 10 to $CPU_3$ 40, four SCs represented by $SC_0$ 100 to $SC_3$ 400, two MACs represented by $MAC_0$ 500 and $MAC_1$ 600, two memories represented by $MEMORY_0$ 50 and $MEMORY_1$ 60, and two IOPs represented by $IOP_0$ 70 and $IOP_1$ 80. Coherence processing of the caches of all the CPUs is allotted to the four $SC_0$ 100 to $SC_3$ 400 that are address-interleaved.

Each CPU has its own bus to all the SC, and each SC has its own bus to all the other SC. Memory access requests handled by the $SC_0$ 100 and the $SC_1$ 200 are processed by the $MAC_0$ 500 that controls the $MEMORY_0$ 50. Similarly, memory access requests handled by the $SC_2$ 300 and the $SC_3$ 400 are processed by the MAC1 600 that controls the $MEMORY_1$ 60.

Each IOP is connected to only one SC. Therefore, memory access requests from each IOP are sent to the SC that the IOP is connected to. When the SC that receives the memory access request is different from the SC that handles the request address, the SC that receives the memory access request transfers it to the SC that handles the request address, and entrusts the processing to that SC.

Figure 2:
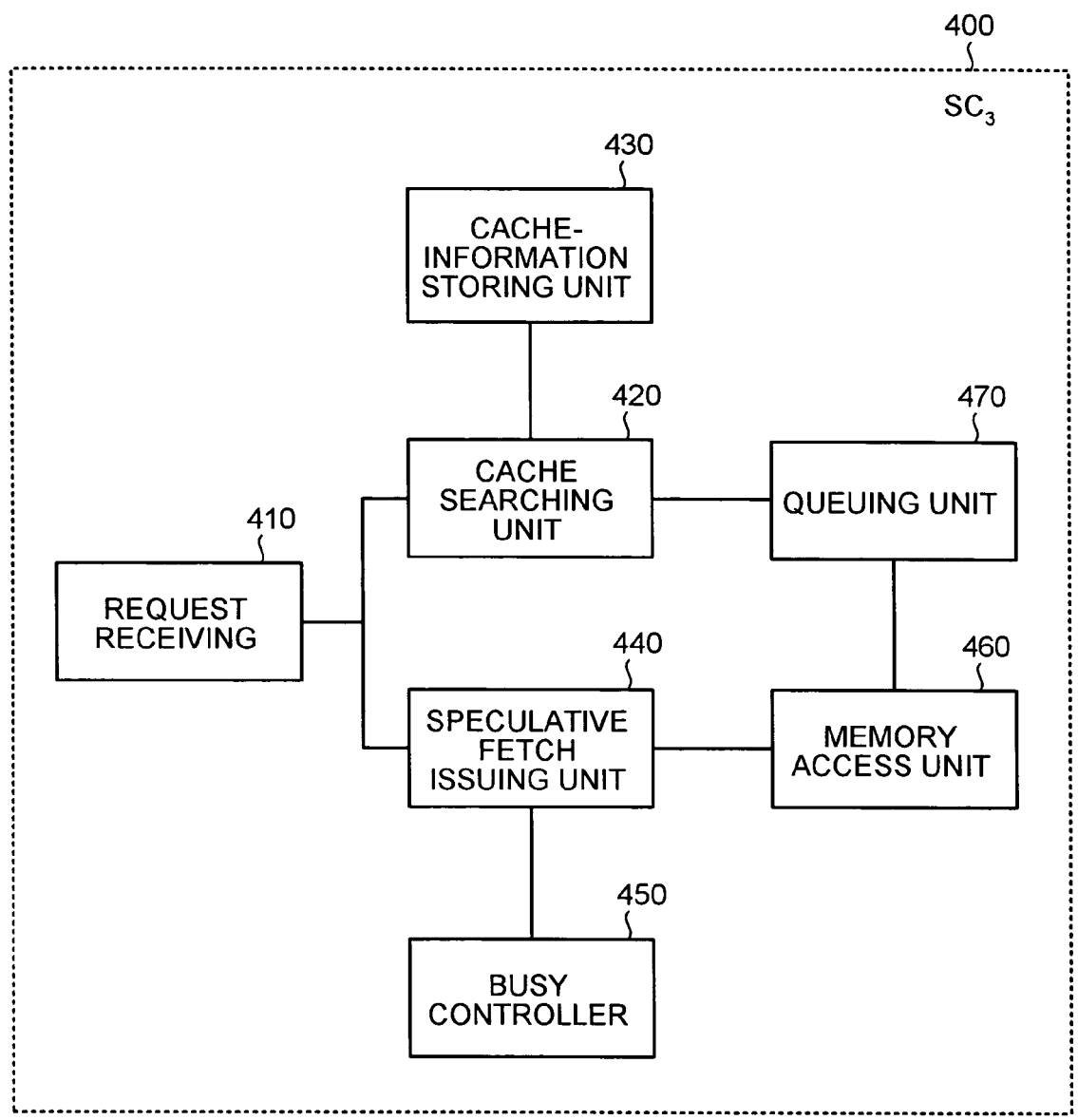
FIG. 2 is a functional block diagram of the constitution of an $SC_3$.

FIG. 2 is a functional block diagram of the constitution of the $SC_3$ 400. As shown in FIG. 2, the $SC_3$ 400 has a request receiver 410, a cache search unit 420 shown in FIG. 1, a cache information storage unit 430, a speculative-fetch issuing unit 440, a busy controller 450, a memory access unit 460, and a queue unit 470.

The request receiver 410 is a processor that receives memory fetch requests from the $CPU_0$ 10 to $CPU_3$ 40, the $IOP_1$ 80, and other SCs, and sends the received memory fetch requests to the cache search unit 420 and the speculative-fetch issuing unit 440.

The cache search unit 420 is a processor that checks whether data, requested in a memory fetch request received from the request receiver 410, is registered in the cache of a CPU, and sends its check result to the queue unit 470.

The cache information storage unit 430 stores tag information of caches of all the CPUs, and stores information such as the memory address, update status, and the like, of data registered in the cache. The cache search unit 420 can check whether the requested data is registered in the cache of a CPU by searching the cache information storage unit 430.

The speculative-fetch issuing unit 440 is a processor that issues speculative fetches for the $MAC_1$ 600 based on the status of the bus between the $SC_3$ 400 and the $MAC_1$ 600. That is, the speculative-fetch issuing unit 440 issues speculative fetches when the load on the bus between the $SC_3$ 400 and the $MAC_1$ 600 is low, and does not issue them when the load on the bus is high.

By issuing speculative fetches based on the status of the bus between the $SC_3$ 400 and the $MAC_1$ 600, the speculative-fetch issuing unit 440 can prevent any increase in the load on the bus caused by executing speculative fetches.

The busy controller 450 is a processor that manages the load status of the bus between the $SC_3$ 400 and the $MAC_1$ 600 by measuring the usage rate of the bus during a fixed time period. When the load of the bus is high, the busy controller 450 notifies the speculative-fetch issuing unit 440 that the bus load is high. When the speculative-fetch issuing unit 440 receives a notification from the busy controller 450 that the load of the bus is high, the speculative-fetch issuing unit 440 stops issuing speculative fetches.

The memory access unit 460 is a processor that transmits memory fetch requests to the $MAC_1$ 600, and receives data that the $MAC_1$ 600 sends in response to the memory fetch requests.

The queue unit 470 is a processor that makes a queue of the search result of the cache information storage unit 430, performed by the cache search unit 420, with response data, sent from the $MAC_1$ 600 in response to a speculative fetch.

When the queue for the search result of the cache information and the response data of the speculative fetch is another SC, the queue unit 470 transfers the search result of the cache information and the response data of the speculative fetch to the SC that is the queue.

The queue for the search result of the cache information and the data obtained by speculative fetching is not limited to the SC that issued the speculative fetch. For example, if the improvement in the memory latency achieved by speculative fetching is to be utilized fully, the best queue is the terminal SC. Therefore, the queue unit 470 may, conversely, be specified as a queue by another SC.

Figure 3:
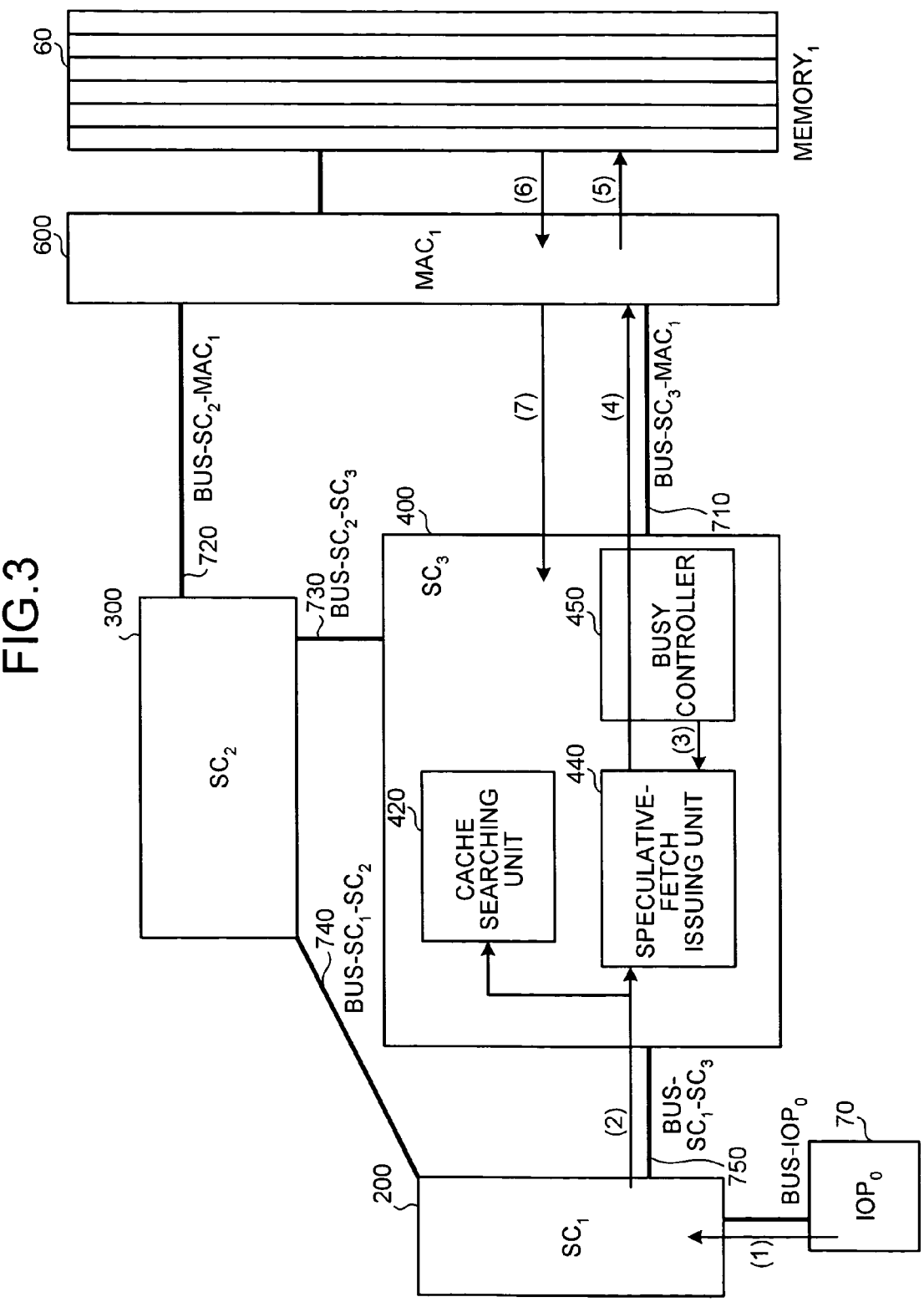
FIG. 3 is a diagram of speculative fetching control, performed by the information processing apparatus according to the first embodiment.

FIG. 3 is a diagram of speculative fetching control, performed by the information processing apparatus according to the first embodiment. In the information processing apparatus according to the first embodiment, when an $IOP_0$ 70 executes a memory fetch at an address in the $MEMORY_1$ 60, the $IOP_0$ 70 issues a memory fetch request (1) to the $SC_1$ 200. Then, by address-interleaving, the $SC_1$ 200 transfers the memory fetch request (2) to the $SC_3$ 400 and entrusts processing thereto.

The $SC_3$ 400 receives the memory fetch request, and sends it to the cache search unit 420 and the speculative-fetch issuing unit 440. When the cache search unit 420 receives the memory fetch request, it starts checking the cache registration statuses of all the CPUs.

The speculative-fetch issuing unit 440 determines whether to issue a speculative fetch based on a busy status notification signal (3), which relates to the bus $BUS\text{-}SC_3\text{-}MAC_1$ 710 between $SC_3$ 400 to $MAC_1$ 600 and is transmitted from the busy controller 450. When the load on $BUS\text{-}SC_3\text{-}MAC_1$ 710 is high, the speculative-fetch issuing unit 440 stops the issue of the speculative fetch request, thereby preventing any increase in the load on the bus. When the load on $BUS\text{-}SC_3\text{-}MAC_1$ 710 is low, the speculative-fetch issuing unit 440 issues the speculative fetch request so as to improve memory access latency.

The $MAC_1$ 600 then activates the memory fetch of the $MEMORY_1$ 60 (5), and transfers (7) the response data (6) to the $SC_1$ 400. Of course, (5), (6), and (7) are not executed when no speculative fetch request is received.

By determining whether to issue a speculative fetch based on the busy status notification signal relating to $BUS\text{-}SC_3\text{-}MAC_1$ 710 in this way, the speculative-fetch issuing unit 440 can reduce the possibility of an excessive load on $BUS\text{-}SC_3\text{-}MAC_1$ 710.

Figure 4:
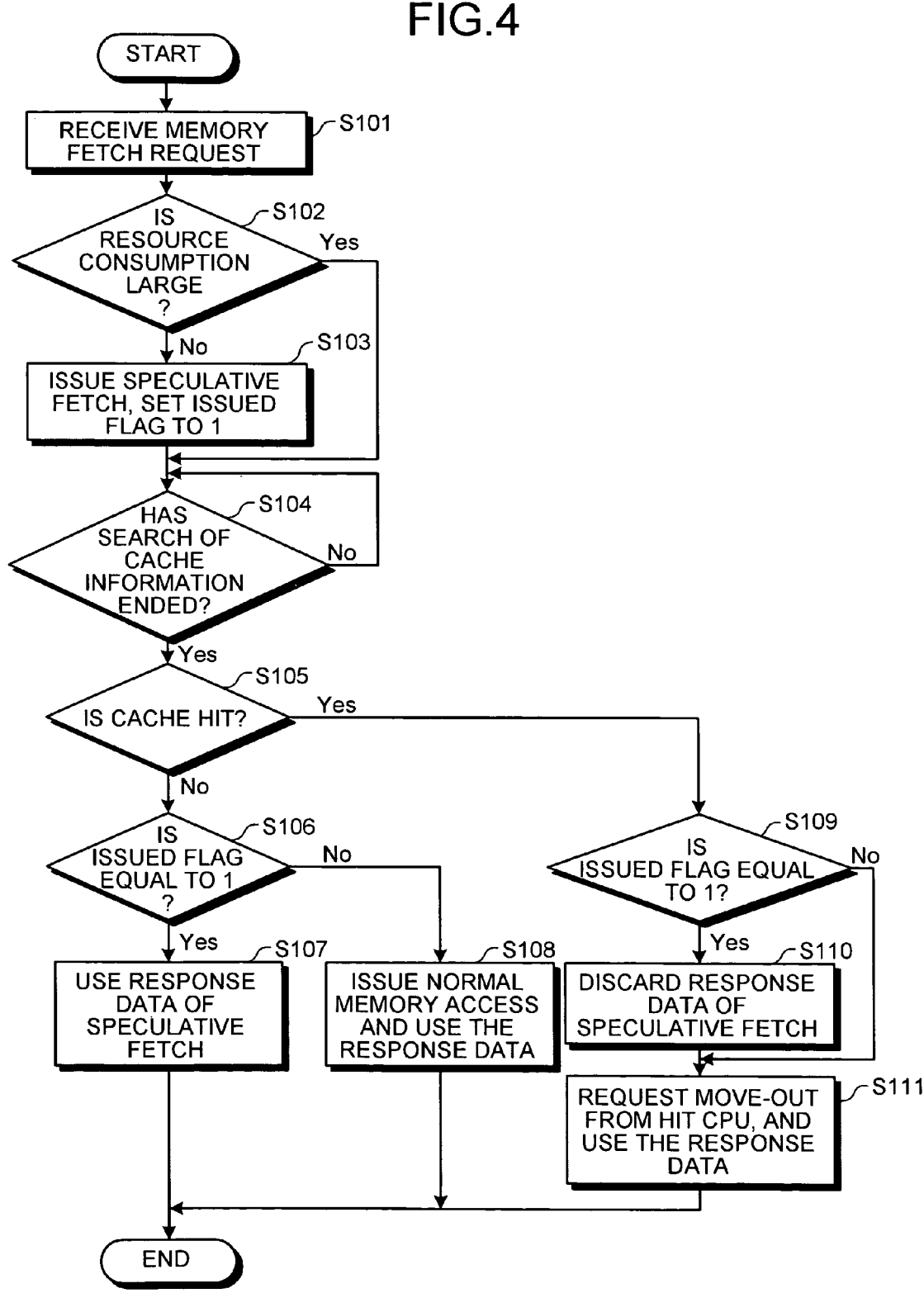
FIG. 4 is a flowchart of a processing sequence of speculative fetch control processing, executed by the information processing apparatus according to the first embodiment.

FIG. 4 is a flowchart of a processing sequence of speculative fetch control processing, executed by the information processing apparatus according to the first embodiment. The following explanation describes a case where $SC_3$ 400 issues a speculative fetch.

As shown in FIG. 4, when the $SC_3$ 400 receives the memory fetch request (step S101), the speculative-fetch issuing unit 440 determines whether resource consumption is large, i.e. whether the load of $BUS\text{-}SC_3\text{-}MAC_1$ 710 is high (step S102).

When the result of the determination is that resource consumption is not large, the speculative-fetch issuing unit 440 issues a speculative fetch, and records the issue of the speculative fetch by setting an issued flag to "1" (step S103).

The queue unit 470 waits for the search of the cache information to end, and, when it ends (step S104, Yes), determines whether the memory fetch request has hit in the cache (step S105). When it did not hit the cache, it is determined whether the issued flag is "1" (step S106).

When the issued flag is "1", a speculative fetch has been issued, and therefore, the response data of the speculative fetch is used (step S107). When the issued flag is not "1", no speculative fetch has been issued, and therefore, a normal memory access is issued and its response data is used (step S108).

On the other hand, when the cache is hit, it is determined whether the issued flag is "1" (step S109). When the issued flag is "1", a speculative fetch has been issued, and therefore, the response data of the speculative fetch is discarded (step S110). A move-out request is then sent to the CPU containing the hit cache, and its response data is used (step S111).

By determining whether there is a high load on $BUS\text{-}SC_3\text{-}MAC_1$ 710, and stopping issue of a speculative fetch when the load is high, the speculative-fetch issuing unit 440 can reduce the possibility of excessively increasing the load of the $BUS\text{-}SC_3\text{-}MAC_1$ 710.

As described above, according to the first embodiment, the busy controller 450 manages the load status of the $BUS\text{-}SC_3\text{-}MAC_1$ 710, and, when the load is high, notifies the speculative-fetch issuing unit 440 that the load on $BUS\text{-}SC_3\text{-}MAC_1$ 710 is high. When the load on the $BUS\text{-}SC_3\text{-}MAC_1$ 710 is high, the speculative-fetch issuing unit 440 stops issuing speculative fetches, thereby preventing any increase in the load on the $BUS\text{-}SC_3\text{-}MAC_1$ 710 caused by issuing speculative fetches, and improving the latency of memory access.

While the issuing of speculative fetches is stopped when there is a high load on the $BUS\text{-}SC_3\text{-}MAC_1$ 710 in the first embodiment described above, a speculative fetch can be issued even when the load is concentrated on the $SC_3$ 400 and there is a high load on the $BUS\text{-}SC_3\text{-}MAC_1$ 710, by using another bus instead of $BUS\text{-}SC_3\text{-}MAC_1$ 710. Accordingly, a second embodiment describes an SC that, when the load is concentrated on some of the SCs, issues a speculative fetch after dynamically changing the transfer path of the response data of the speculative fetch.

Figure 5:
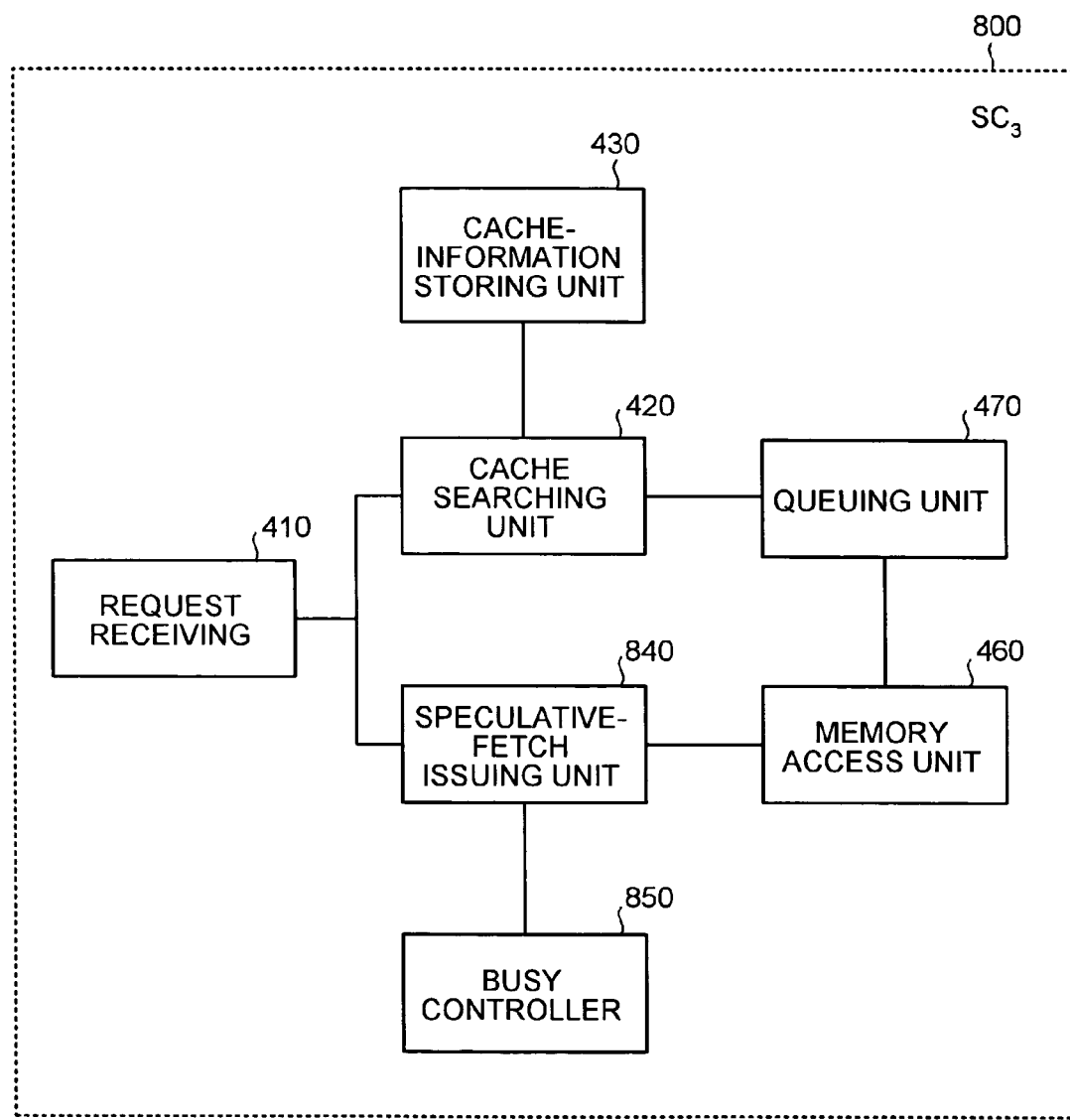
FIG. 5 is a functional block diagram of the constitution of an $SC_3$ according to a second embodiment.

FIG. 5 is a functional block diagram of the constitution of a $SC_3$ 800 according to the second embodiment. As shown in FIG. 5, in comparison with the $SC_3$ 400 of FIG. 2, the $SC_3$ 800 has a speculative-fetch issuing unit 840 instead of the speculative-fetch issuing unit 440, and has a busy controller 850 instead of the busy controller 450.

The speculative-fetch issuing unit 840 is a processor that issues speculative fetches relating to the $MAC_1$ 600 based not only on the status of the bus $BUS\text{-}SC_3\text{-}MAC_1$ 710 between the $SC_3$ 800 and the $MAC_1$ 600, but also on the status of the bus $BUS\text{-}SC_2\text{-}MAC_1$ 720 between the $MAC_1$ 600 and the $SC_2$ 300.

When the load on the bus connecting to the $MAC_1$ 600 is high, the speculative-fetch issuing unit 840 checks the status of the bus $BUS\text{-}SC_2\text{-}MAC_1$ 720, and, when the bus $BUS\text{-}SC_2\text{-}MAC_1$ 720 does not have a high load, commands the $MAC_1$ 600 to send response data relating to the speculative fetch request to the $SC_2$ 300, and issues a speculative fetch.

When the load on the bus $BUS\text{-}SC_2\text{-}MAC_1$ 720 is not high, the speculative-fetch issuing unit 840 commands the $MAC_1$ 600 to send response data relating to the speculative fetch request to the $SC_2$ 300, and issues a speculative fetch, thereby preventing further concentration of load on the $SC_2$ 300 caused by speculative fetching when load is already concentrated on the $SC_2$ 300.

The busy controller 850 is a processor that, in addition to managing the load status of the bus between the $MAC_1$ 600 and the $SC_2$ 300, also manages the load status of the bus $BUS\text{-}SC_2\text{-}MAC_1$ 720 between the $MAC_1$ 600 and the $SC_2$ 300, and, when the load on the bus is high, notifies the speculative-fetch issuing unit 840 of the high bus load.

Figure 6:
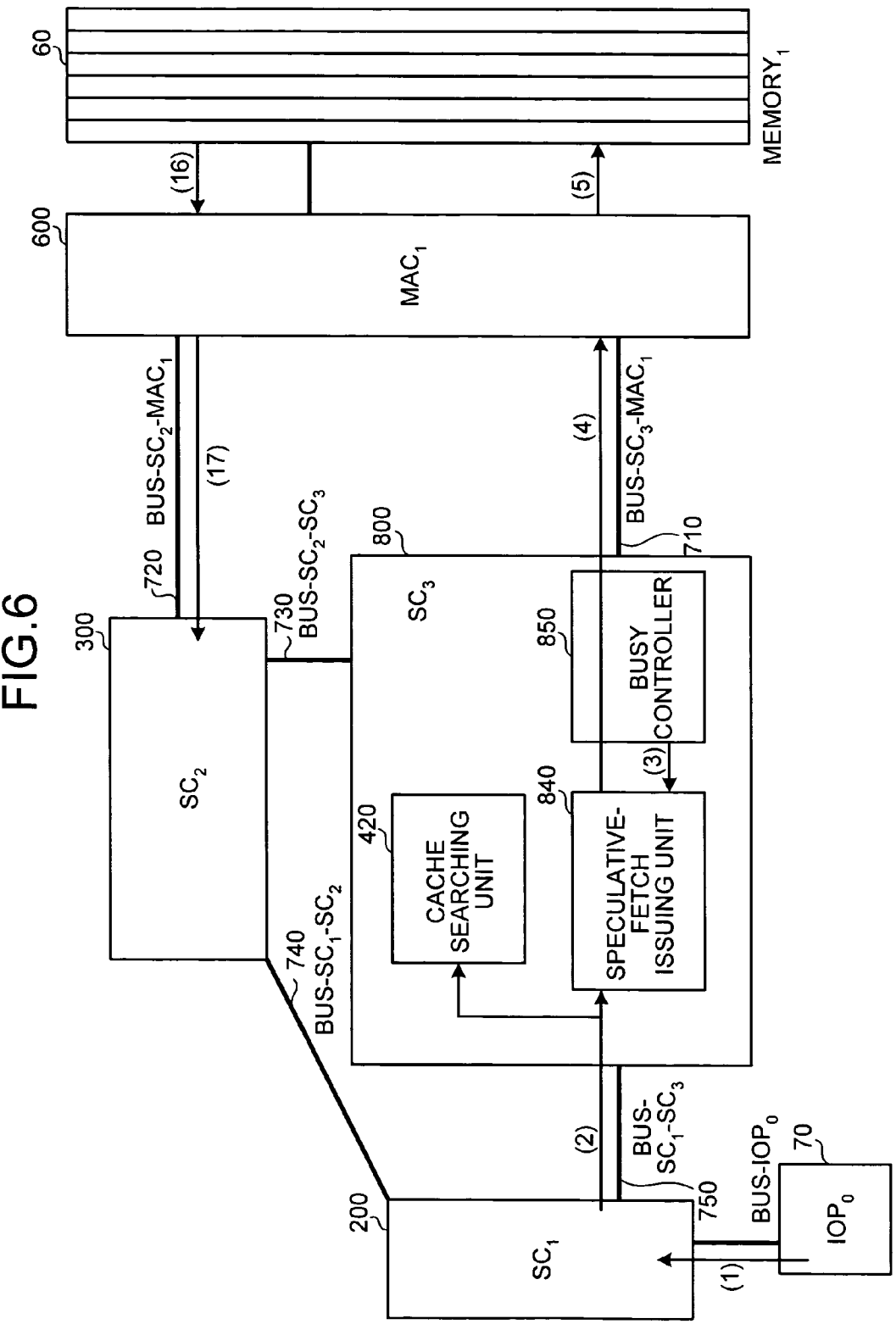
FIG. 6 is an explanatory diagram of speculative fetching control, performed by an information processing apparatus according to the second embodiment.

FIG. 6 is an explanatory diagram of speculative fetching control, performed by the information processing apparatus according to the second embodiment. In the information processing apparatus according to the second embodiment, even when there is a high load on the bus $BUS\text{-}SC_3\text{-}MAC_1$ 710, the load on the bus $BUS\text{-}SC_2\text{-}MAC_1$ 720 is comparatively low. Therefore, when the busy controller 850 sends notification (3) of the busy status of the bus $BUS\text{-}SC_3\text{-}MAC_1$ 710, issuing of speculative fetches is not stopped as in the first embodiment, and a speculative fetch request (4) is issued to the MAC, 600 while commanding the $MAC_1$ 600 to transmit response data for the speculative fetch request to the $SC_2$ 300.

The $MAC_1$ 600 receives the speculative fetch request, activates a memory fetch (5) in the $MEMORY_1$ 60, and transfers (17) the response data (16) to the $SC_2$ 300. The $SC_2$ 300 receives the speculative fetch request response data (17), and transfers it by using the bus $BUS\text{-}SC_1\text{-}SC_2$ 740 between $SC_1$ 200 and $SC_2$ 300, or the bus $BUS\text{-}SC_2\text{-}SC_3$ 730 between $SC_2$ 300 and $SC_3$ 800.

Even when there is a high load on the bus $BUS\text{-}SC_3\text{-}MAC_1$ 710, by using the bus $BUS\text{-}SC_2\text{-}MAC_1$ 720 in this way, speculative fetching can be executed without further increasing the load on the bus BUS-SC$_3$-MAC$_1$ 710, and memory access latency can be improved.

Figure 7:
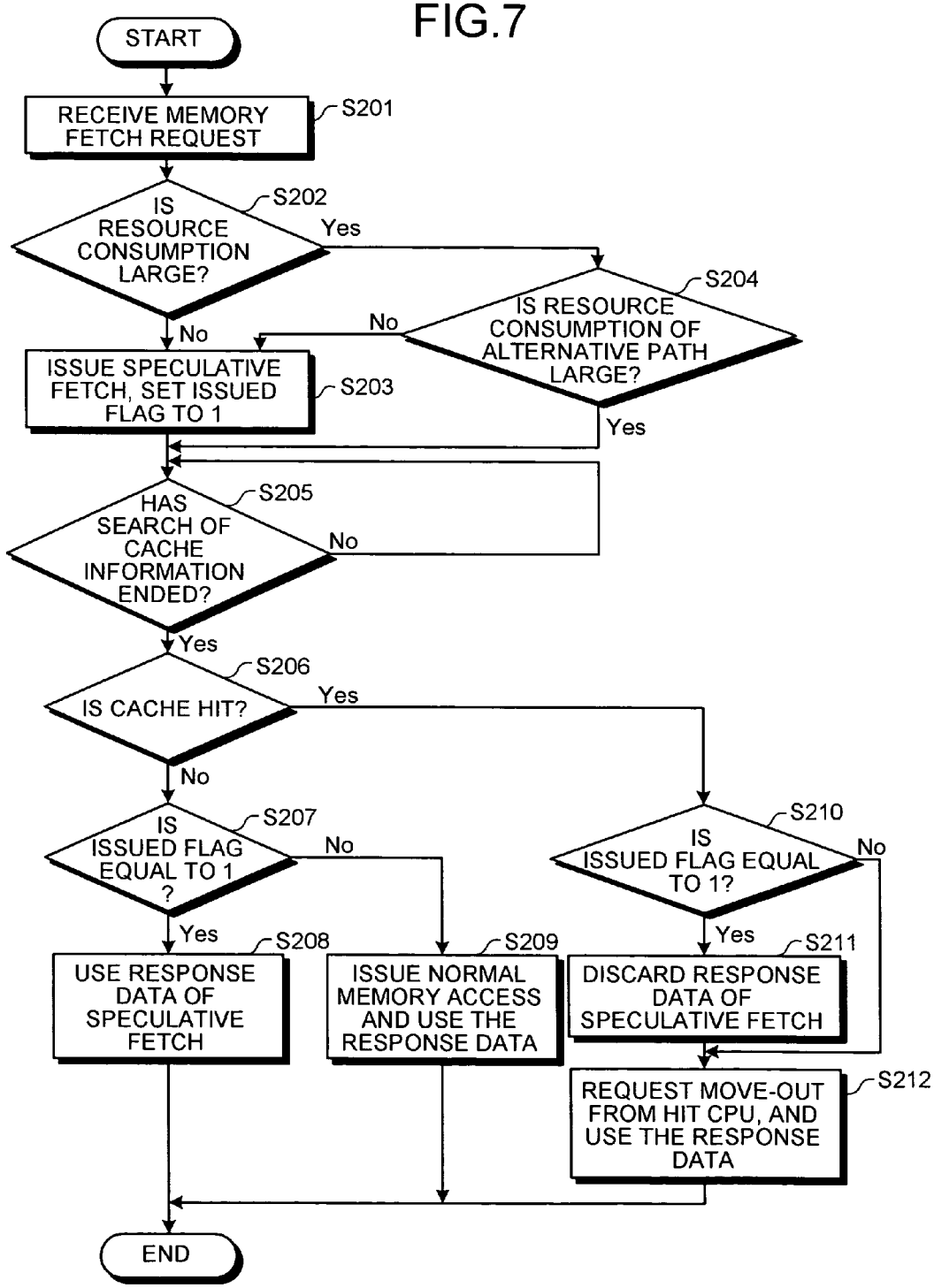
FIG. 7 is a flowchart of a processing sequence of speculative fetch control processing, executed by the information processing apparatus according to the second embodiment.

FIG. 7 is a flowchart of a processing sequence of speculative fetch control processing, executed by the information processing apparatus according to the second embodiment. The following explanation describes an example in which SC$_3$ 800 issues a speculative fetch.

As shown in FIG. 7, when SC$_3$ 800 receives a memory fetch request (step S201), the speculative-fetch issuing unit 840 determines whether resource consumption is large, i.e. whether the load of BUS-SC$_3$-MAC$_1$ 710 is high (step S202).

When the result of the determination is that resource consumption is not large, the speculative-fetch issuing unit 840 issues a speculative fetch, and records the issue of the speculative fetch by setting the issued flag to "1" (step S203). On the other hand, when resource consumption is large, the speculative-fetch issuing unit 840 determines whether resource consumption of the alternative path is large, i.e. whether there is a high load on the BUS-SC$_2$-MAC$_1$ 720 (step S204). When the load on the alternative path is not high, the speculative-fetch issuing unit 840 issues the speculative fetch request while commanding the MAC$_1$ 600 to send response data for the speculative fetch request to SC$_2$ 300, and records the issue of the speculative fetching by setting the issued flag to "1" (step S203).

The queue unit 470 waits for the search of the cache information to end, and, when it ends (step S205, Yes), determines whether the memory fetch request has hit in the cache (step S206). When it did not hit the cache, it is determined whether the issued flag is "1" (step S207).

When the issued flag is "1", a speculative fetch has been issued, and therefore, the response data of the speculative fetch is used (step S208). When the issued flag is not "1", no speculative fetch has been issued, and therefore, a normal memory access is issued and its response data is used (step S209).

On the other hand, when the cache is hit, it is determined whether the issued flag is "1" (step S210). When the issued flag is "1", a speculative fetch may have been issued, and therefore, the response data of the speculative fetch is discarded (step S211). A move-out request is then sent to the CPU containing the hit cache, and its response data is used (step S212).

When there is a high load on the BUS-SC$_3$-MAC$_1$ 710, the speculative-fetch issuing unit 840 determines whether there is a high load on BUS-SC$_2$-MAC$_1$ 720, and, when the load is low, issues a speculative fetch request while commanding the MAC$_1$ 600 to send response data for the speculative fetch request to SC$_2$ 300. Accordingly, the speculative-fetch issuing unit 840 can issue the speculative fetching without further increasing the load on the BUS-SC$_3$-MAC$_1$ 710.

As described above, according to the second embodiment, the busy controller 850 manages the load status of the BUS-SC$_2$-MAC$_1$ 720 in addition to that of the BUS-SC$_3$-MAC$_1$ 710, and, when the loads of these buses are high, notifies the speculative-fetch issuing unit 840 of the high bus load. When the load on the BUS-SC$_3$-MAC$_1$ 710 is high, the speculative-fetch issuing unit 840 determines whether there is a high load on the BUS-SC$_2$-MAC$_1$ 720. When the load is not high, the speculative-fetch issuing unit 840 issues a speculative fetch request while commanding the MAC$_1$ 600 to send response data for the speculative fetch request to SC$_2$ 300. This prevents any further increase in the load on the BUS-SC$_3$-MAC$_1$ 710 caused by speculative fetching, and enables the speculative fetch to be issued while improving the memory access latency.

While the first and the second embodiments describe examples where the SC$_3$ is the queue for the cache search result and the speculative fetch response data, latency can be effectively shortened by using the terminal SC as the queue. However, when the terminal SC is the queue, the speculative fetch response data must be transferred to the terminal SC even after determining to discard the speculative fetch response data, based on the cache search result.

Consequently, when the load on the transfer path to the terminal SC is high, the speculative fetch response data that is due to be discarded consumes hardware resources, further increasing the load. Accordingly, a third embodiment will be explained wherein SC$_1$ 200 is the terminal SC and, when there is a high load on the transfer path to SC$_1$ 200, the queue is dynamically changed to an SC other than the terminal SC.

Figure 8:
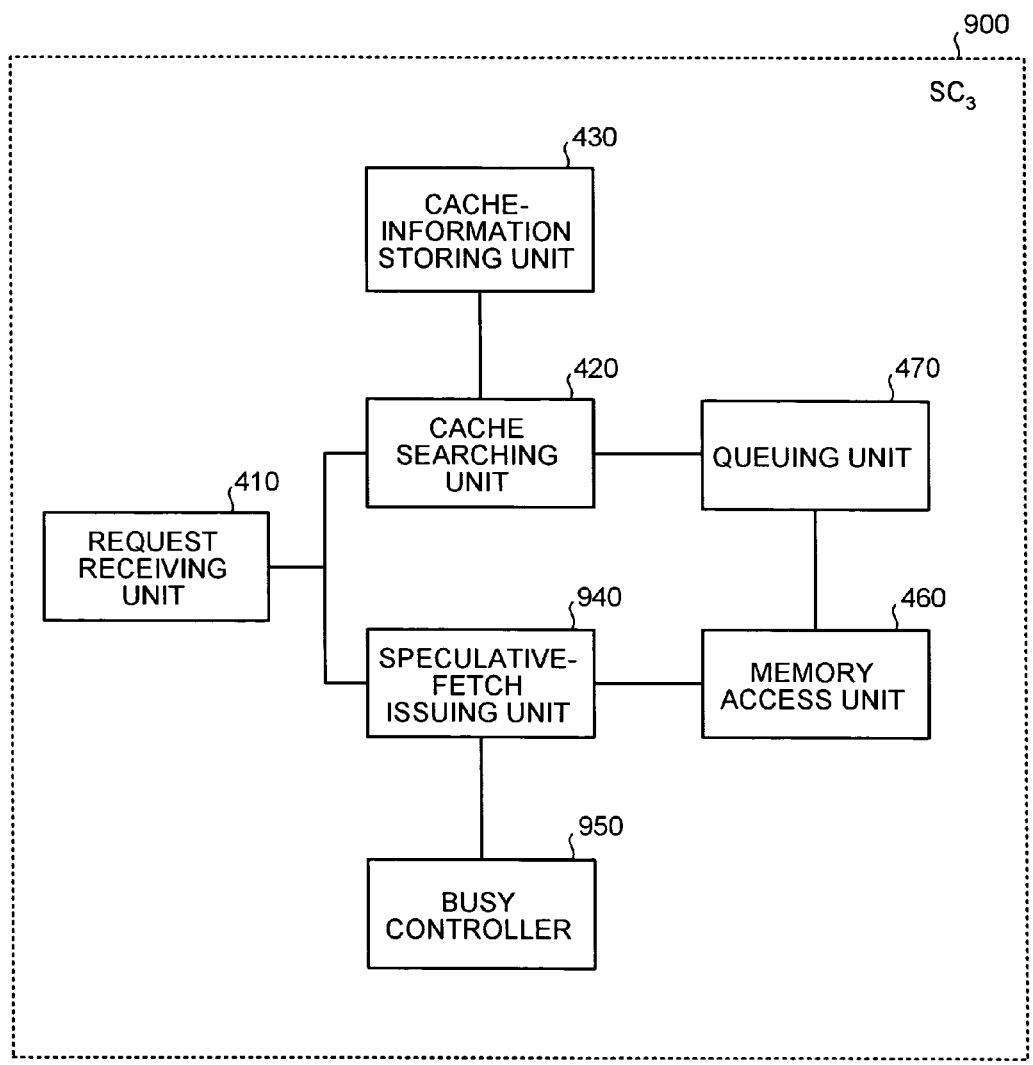
FIG. 8 is a functional block diagram of the constitution of an $SC_3$ according to a third embodiment.

FIG. 8 is a functional block diagram of the constitution of the SC$_3$ 900 according to the third embodiment. As shown in FIG. 8, in comparison with the SC$_3$ 400 of FIG. 2, the SC$_3$ 900 has a speculative-fetch issuing unit 940 instead of the speculative-fetch issuing unit 440, and has a busy controller 950 instead of the busy controller 450.

The speculative-fetch issuing unit 940 is a processor that issues speculative fetches relating to the MAC$_1$ 600 based not only on the status of the bus BUS-SC$_3$-MAC$_1$ 710 between the SC$_3$ 900 and the MAC$_1$ 600, but also on the status of a bus BUS-SC$_1$-SC$_3$ 750 between the SC$_3$ 900 and the SC$_1$ 200.

Specifically, when there is a high load on the bus BUS-SC$_1$-SC$_3$ 750 that is used in transferring the speculative fetch response data to the SC$_1$ 200 that is the queue, the speculative-fetch issuing unit 940 changes the queue from the SC$_1$ 200 to the SC$_3$ 900, and notifies the MAC$_1$ 600 that the speculative fetch has been issued, and that the queue is the SC$_3$ 900.

When the load on the bus BUS-SC$_1$-SC$_3$ 750 is not high, the speculative-fetch issuing unit 940 notifies the MAC$_1$ 600 that the speculative fetch has been issued, and that the queue is the SC$_3$ 900, thereby preventing BUS-SC$_1$-SC$_3$ 750 from being used wastefully when discarding the speculative fetch response data.

The busy controller 950 is a processor that, in addition to managing the load status of the bus between the MAC$_1$ 600 and the SC$_3$ 900, also manages the load status of the bus BUS-SC$_1$-SC$_3$ 750 between the SC$_3$ 900 and the SC$_1$ 200, and, when the load on the bus is high, notifies the speculative-fetch issuing unit 940 of the high bus load.

Figure 9:
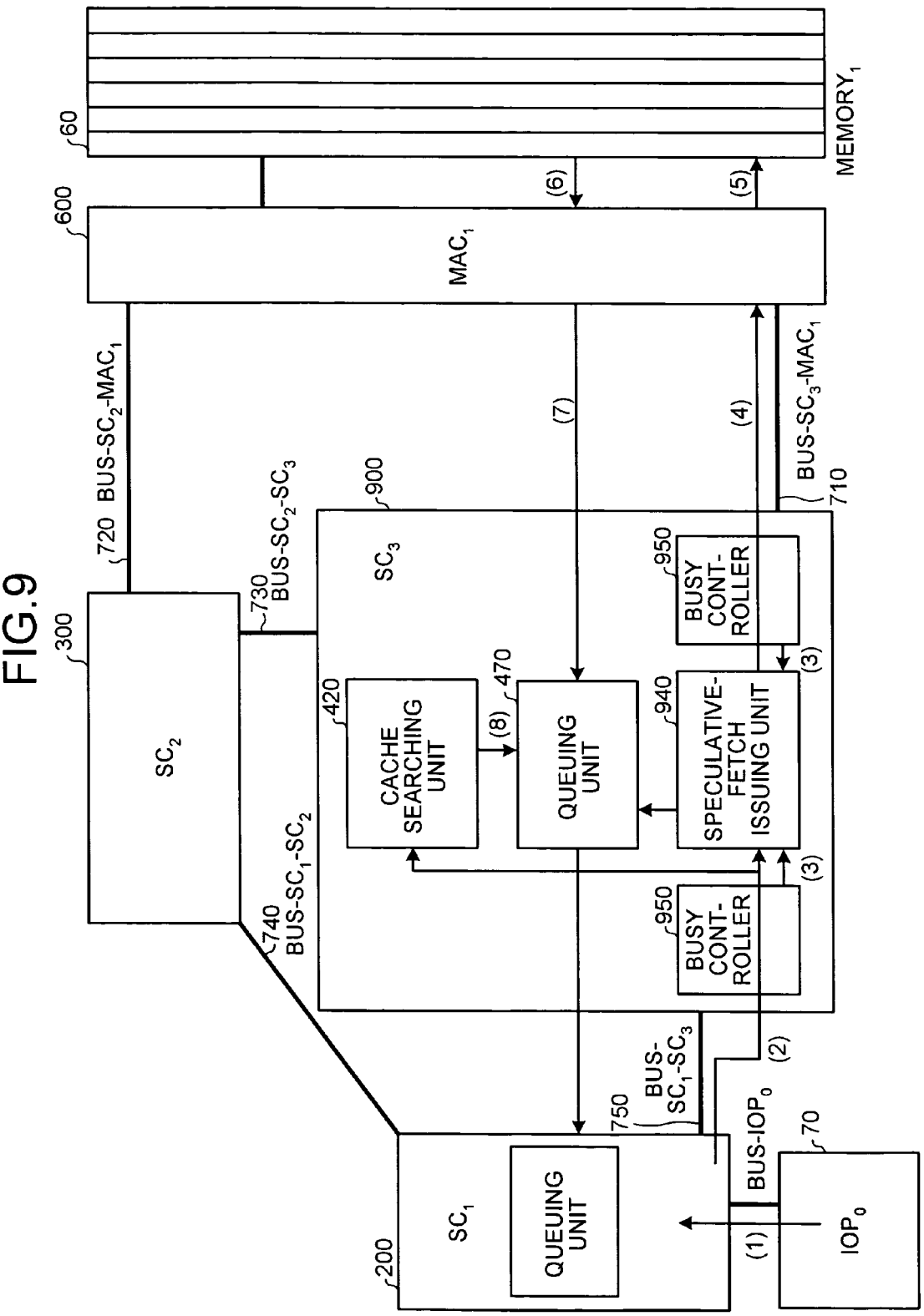
FIG. 9 is an explanatory diagram of speculative fetching control, performed by an information processing apparatus according to the third embodiment.

FIG. 9 is an explanatory diagram of speculative fetching control, performed by the information processing apparatus according to the third embodiment. In the third embodiment, the speculative-fetch issuing unit 940 of the SC$_3$ 900 refers (3) to the busy status of the BUS-SC$_1$-SC$_3$ 750 and the busy status of the BUS-SC$_3$-MAC$_1$ 710, notified by the busy controller 950. When there is a high load on the BUS-SC$_3$-MAC$_1$ 710, the speculative-fetch issuing unit 940 stops issuing a speculative fetch request, and, when the load is not high, issues (4) a speculative fetch request.

When there is a high load on the BUS-SC$_1$-SC$_3$ 750, SC$_3$ 900 is made the queue for the speculative fetch response data and the cache search result (8) instead of the SC$_1$ 200, and the speculative-fetch issuing unit 940 notifies the MAC$_1$ 600 of this change in addition to issuing a speculative fetch request.

The MAC$_1$ 600 receives the speculative fetch request, activates (5) a memory fetch request to the MEMORY$_1$ 60, and transfers (7) the response data (6) to the SC$_3$ 900. At this time, the MAC$_1$ 600 announces notification of the SC$_3$ 900 being the queue simultaneous to issuing the speculative fetch.

The response data of the speculative fetch request received by the SC$_3$ 900 is queued with the cache search result (8) in the queue unit 470 of the SC$_3$ 900. When it is determined, based on the cache search result, to discard the response data of the speculative fetch request, it is discarded in the queue unit 470.

By dynamically changing the queue to the $SC_3$ 900 in this way, it is possible to prevent any further increase in the high load on the bus BUS-$SC_1$-$SC_3$ 750 between the $SC_3$ 900 and the $SC_1$ 200 when discarding the speculative fetch response data.

Figure 10:
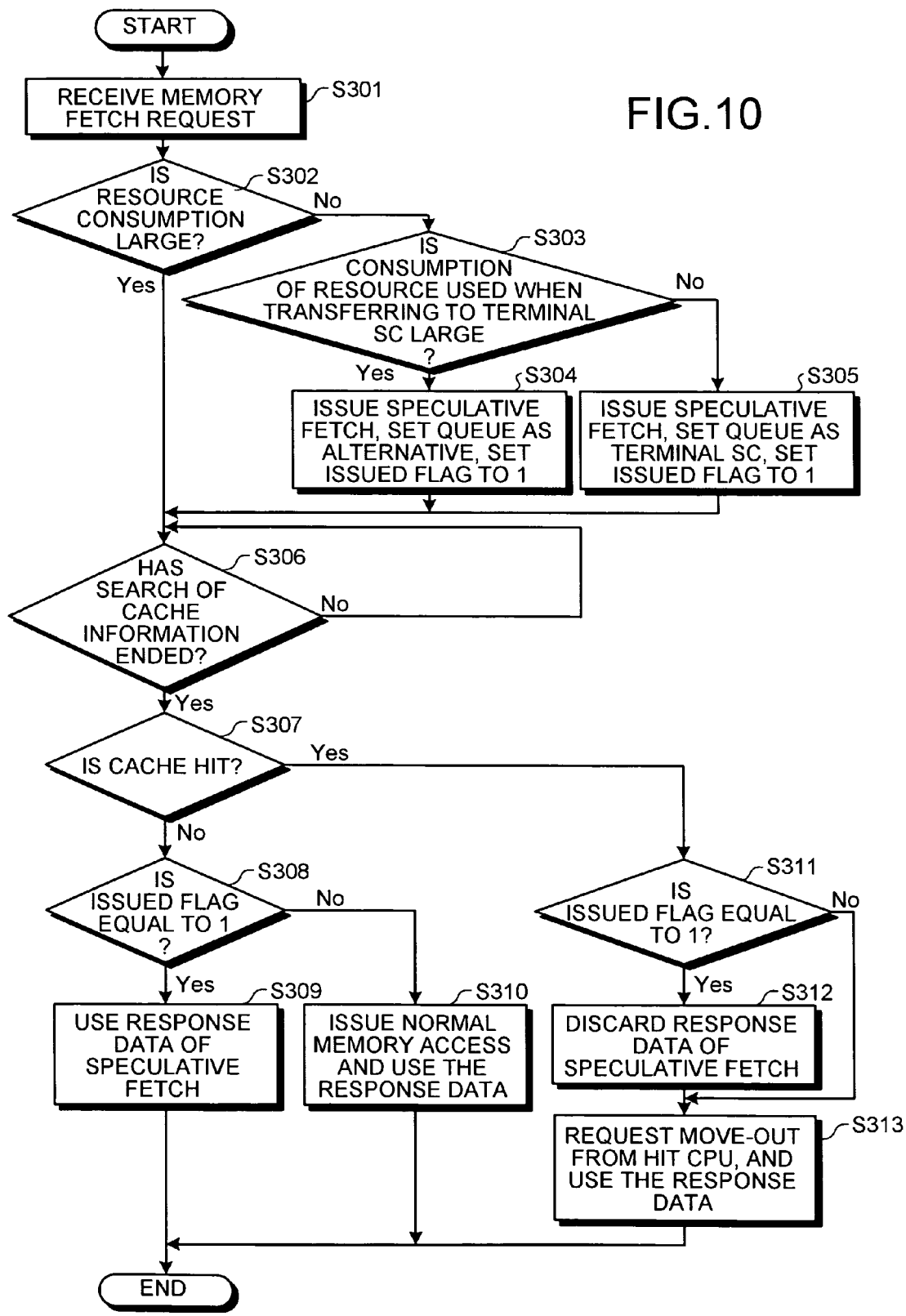
FIG. 10 is a flowchart of a processing sequence of speculative fetch control processing, executed by the information processing apparatus according to the third embodiment.

FIG. 10 is a flowchart of a processing sequence of speculative fetch control processing, executed by the information processing apparatus according to the third embodiment. An example that the $SC_3$ 900 issues a speculative fetch is explained below.

As shown in FIG. 10, when the $SC_3$ 900 receives the memory fetch request (step S301), the speculative-fetch issuing unit 940 determines whether its resource consumption it large, i.e. whether the load on the BUS-$SC_3$-$MAC_1$ 710 is high (step S302).

When the result of the determination is that resource consumption is not large, the speculative-fetch issuing unit 940 determines whether large resources are consumed in transferring the response data to the queue, i.e. whether there is a high load on the BUS-$SC_1$-$SC_3$ 750 (step S303), and, when there is a high load on the BUS-$SC_1$-$SC_3$ 750, issues a speculative fetch while commanding the $MAC_1$ 600 to change the queue to the alternative queue, i.e. the $SC_3$ 900, and records the issue of the speculative fetch by setting the issued flag to "1" (step S304).

When the load on the BUS-$SC_1$-$SC_3$ 750 is not high, the speculative-fetch issuing unit 940 issues the speculative fetch with the terminal SC as the queue, and records the issue of the speculative fetch by setting the issued flag to "1" (step S305).

The queue unit 470 of the SC specified as the queue waits for the search of the cache information to end, and, when it ends (step S306, Yes), determines whether the memory fetch request has hit in the cache (step S307). When it did not hit the cache, it is determined whether the issued flag is "1" (step S308).

When the issued flag is "1", a speculative fetch has been issued, and therefore, the response data of the speculative fetch is used (step S309). When the issued flag is not "1", no speculative fetch has been issued, and therefore, a normal memory access is issued and its response data is used (step S310).

On the other hand, when the cache is hit, it is determined whether the issued flag is "1" (step S311). When the issued flag is "1", a speculative fetch has been issued, and therefore, the response data of the speculative fetch is discarded (step S312). A move-out request is then sent to the CPU containing the hit cache, and its response data is used (step S313).

By determining whether there is a high load on BUS-$SC_1$-$SC_3$ 750, and, when the load on BUS-$SC_1$-$SC_3$ 750 is high, issuing the speculative fetch while commanding the $MAC_1$ 600 to change to the alternative queue, i.e. the $SC_3$ 900, the speculative-fetch issuing unit 940 can issue the speculative fetch without further increasing the load on the BUS-$SC_1$-$SC_3$ 750.

As described above, according to the third embodiment, the busy controller 950 manages the load status of the BUS-$SC_1$-$SC_3$ 750 in addition to the load status of the BUS-$SC_3$-$MAC_1$ 710, and, when the loads of these buses are high, notifies the speculative-fetch issuing unit 940 of the high bus loads. When issuing a speculative fetch, the speculative-fetch issuing unit 940 determines whether there is a high load on the BUS-$SC_1$-$SC_3$ 750. When the load is not high, the speculative-fetch issuing unit 840 issues a speculative fetch request while commanding the $MAC_1$ 600 to change the queue to the $SC_3$ 900. This prevents any further increase in the load on the BUS-$SC_1$-$SC_3$ 750, caused by issuing the speculative fetch.

While the first to the third embodiments describe examples where the $IOP_0$ 70 executes a memory fetch at an address mounted in the $MEMORY_1$ 60, the present invention is not limited to this, and can be similarly applied when a CPU or another IOP executes a memory fetch at an address mounted in the $MEMORY_1$ 60 or the $MEMORY_1$ 50. It can also be similarly applied when there are different numbers of CPUs, SCs, and MACs.

While the first to the third embodiments describe examples where speculative fetching is controlled based on load statuses of buses, the present invention is not restricted to this, and can be similarly applied when speculative fetching is controlled based on the load status of another hardware resource, such as a buffer. The management of the busy-status of the buffer can be performed by counting the number of valid entries in it.

According to the present invention, the memory access waiting time can be prevented from prolonging as a result of speculative fetching, enabling the memory access waiting time to be shortened.

Furthermore, according to the present invention, an increase in the load on the bus that connects to the memory controller, caused by speculative fetching, can be prevented, enabling the memory access waiting time to be shortened.

Moreover, according to the present invention, an increase in the load on the buffer used in speculative fetching, caused by speculative fetching, can be prevented, enabling the memory access waiting time to be shortened.

Furthermore, according to the present invention, when the hardware used in speculative fetching has large resource consumption, speculative fetching is executed by using an alternative hardware, enabling the memory access waiting time to be shortened.

Moreover, according to the present invention, it is possible to prevent a further increase in the consumption of the hardware resource used in transferring response data to the queue, caused by speculative fetching, thereby enabling processing efficiency to be improved.

Furthermore, according to the present invention, it is possible to prevent further increase in the consumption of the hardware resource used in transferring response data from its own apparatus to the queue, enabling processing efficiency to be improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A system controller that executes a speculative fetch from a memory before determining whether data requested for a memory fetch request is in a cache by searching tag information of the cache, the system controller comprising:

a consumption determining unit that monitors a consumption status of a hardware resource used in transferring response data of the speculative fetch to a queue that is nearest to an apparatus that issued the memory fetch request, and determines whether a consumption of the hardware resource exceeds a predetermined value; and a speculative fetch issuing unit that changes queues, in which a response of the speculative fetch is to be queued with a search result of the tag information and in which the response of the speculative fetch is to be discarded based on the search result, when the consumption of the hardware resource exceeds the predetermined value, and issues the speculative fetch, wherein the speculative-fetch issuing unit changes the queues from the queue that is nearest to the apparatus to an alternative queue, other than the queue that is nearest to the apparatus, and discards the response of the speculative fetch in the alternative queue based on the search result.

2. The system controller according to claim 1, wherein the hardware resource is a bus that connects to a memory controller that requests the memory fetch.

3. The system controller according to claim 2, wherein the consumption determining unit determines whether a consumption of the bus exceeds the predetermined value by using a usage rate of the bus during a fixed period of time.

4. The system controller according to claim 1, wherein the hardware resource is a buffer used in the speculative fetch.

5. The system controller according to claim 4, wherein the consumption determining unit determines whether a consumption of the buffer exceeds the predetermined value by using number of valid entries in the buffer.

6. The system controller according to claim 1, wherein the speculative-fetch issuing unit determines whether there is the alternative queue by using other system controller.

7. The system controller according to claim 1, wherein the speculative-fetch issuing unit specifies the system controller itself as the alternative queue, and executes the speculative fetch.

8. An information processing apparatus that, when executing a memory fetch, executes a speculative fetch from a memory before determining whether data requested for a memory fetch request is in a cache by searching tag information of the cache, the information processing apparatus comprising:

a consumption determining unit that monitors a consumption status of a hardware resource used in transferring response data of the speculative fetch to a queue that is nearest to an apparatus that issued the memory fetch request and determines whether a consumption of the hardware resource exceeds a predetermined value; and a speculative fetch issuing unit that changes queues, in which a response of the speculative fetch is to be queued with a search result of the tag information and in which the response of the speculative fetch is to be discarded based on the search result, when the consumption of the hardware resource exceeds the predetermined value, and issues the speculative fetch, wherein the speculative-fetch issuing unit changes the queues from the queue that is nearest to the apparatus to an alternative queue, other than the queue that is nearest to the apparatus, and discards the response of the speculative fetch in the alternative queue based on the search result.

9. A speculative fetching method for a system controller that executes a speculative fetch from a memory before determining whether data requested for a memory fetch request is in a cache by searching tag information of the cache, the speculative fetching method comprising:

monitoring a consumption status of a hardware resource used in transferring response data of the speculative fetch to a queue that is nearest to an apparatus that issued the memory fetch request determining whether a consumption of the hardware resource exceeds a predetermined value; and changing queues, in which a response of the speculative fetch is to be queued with a search result of the tag information and in which the response of the speculative fetch is to be discarded based on the search result, when the consumption of the hardware resource exceeds the predetermined value; the changing including changing the queues from the queue that is nearest to an apparatus that issued the memory fetch to an alternative queue, other than the queue that is nearest to the apparatus that issued the memory fetch; issuing the speculative fetch; and discarding the response of the speculative fetch in the alternative queue when it is determined to discard the response of the speculative fetch in the alternative queue based on the search result.

10. The speculative fetching method according to claim 9, wherein the hardware resource is a bus that connects to a memory controller that requests the memory fetch.

11. The speculative fetching method according to claim 10, wherein the determining includes determining whether a consumption of the bus exceeds the predetermined value by using a usage rate of the bus during a fixed period of time.

12. The speculative fetching method according to claim 9, wherein the hardware resource is a buffer used in the speculative fetch.

13. The speculative fetching method according to claim 12, wherein the determining includes determining whether a consumption of the buffer exceeds the predetermined value by using number of valid entries in the buffer.

14. The speculative fetching method according to claim 9, further comprising determining whether there is the alternative queue by using other system controller.

15. The speculative fetching method according to claim 9, further comprising specifying the system controller itself as the alternative queue, and executes the speculative fetch.

* * * * *